June 24, 1952　　　　　H. C. RIORDAN　　　　　2,601,633
FIBROUS STRIP HAVING ABSORBING SECTIONS ALTERNATING
WITH NONABSORBING SECTIONS, AND APPARATUS AND
METHOD OF PRODUCING SAME
Filed Aug. 27, 1948　　　　　　　　　　2 SHEETS—SHEET 2

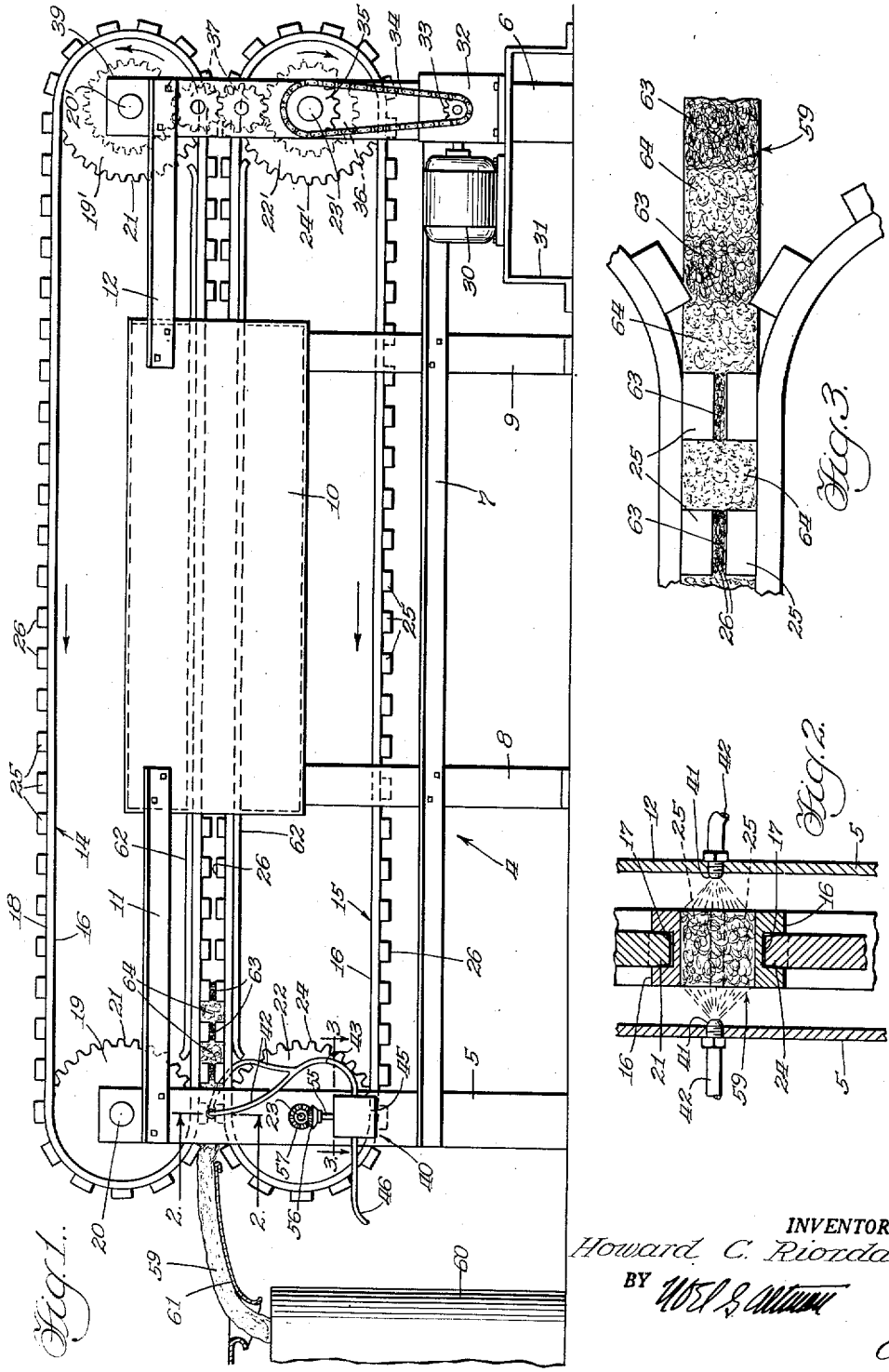

INVENTOR.
Howard C. Riordan
BY
Atty.

Patented June 24, 1952

2,601,633

UNITED STATES PATENT OFFICE 2,601,633

FIBROUS STRIP HAVING ABSORBING SECTIONS ALTERNATING WITH NONABSORBING SECTIONS, AND APPARATUS AND METHOD OF PRODUCING SAME

Howard C. Riordan, Oak Park, Ill.

Application August 27, 1948, Serial No. 46,376

14 Claims. (Cl. 117—140)

This invention relates to a new form of fibrous strip having absorbing sections spaced lengthwise thereof and intervening non-absorbing sections, and an apparatus and method for producing the same.

Fibrous strips constructed according to this invention are particularly useful in the manufacture of tampons. The strips comprise an elongated mass of loose heterogeneously arranged organic fibers, preferably cotton. Such strips are convenient to use in the production of a type of tampon wherein axially adjacent sections are respectively absorbent and non-absorbent of liquid. Short lengths of the preformed strip are used, and these short lengths of the strip are so cut therefrom that at least one transverse portion thereof is non-absorbent and at least another transverse portion is absorbent. Usually the strip is severed at the junction of absorbent and non-absorbent sections wherefore one end portion of each resulting short length will be absorbent and the opposite end portion thereof non-absorbent. The tampons are completed by encasing the short strip lengths in a porous jacket, preferably surgical gauze. Tampons so constituted are well adapted for applying medicament in the vaginal passage. The medicament is carried by the absorbent end which is inserted foremost into the passage, while the non-absorbent end of the tampon forms a barrier to egress of body fluids, thereby preventing dissipation of the medicament and causing localized application thereof where desired.

The general object of this invention is to provide a fibrous strip having alternate axially spaced sections of moisture absorbent fibers and intervening sections wherein the fibers are relatively non-absorbent, it being contemplated that the non-absorbent fibers shall possess this character because of being impregnated with a moisture excluding substance or because of being coated with a moisture impervious film.

A further object is to provide a fibrous strip according to the preceding object, wherein the fibers are heterogeneously arranged in a non-compacted condition and wherein the cross sectional pattern and area are substantially uniform throughout the length of the strip.

A still further object is to provide an improved method of making a strip embodying the features recited in the preceding objects, including the steps of compressing and shielding alternate sections of an absorbent fibrous strip while treating the intervening sections with a moisture excluding substance. It is also contemplated that the moisture excluding substance be one appliable in liquid form subsequently settable in place, that said alternate sections remain compressed and shielded until the moisture excluding substance becomes set, and that setting of such substance be accelerated by subjecting the treated sections to heat.

Another object is to provide an apparatus for treating absorbent strips of heterogeneously arranged fibers, said apparatus including means arranged to compress alternate axially spaced sections, and spray means for treating the intervening sections with a moisture excluding liquid, and the compressing means serving to shield the compressed sections and to prevent the spreading of the liquid thereto from the intervening sprayed sections.

A more specific object is the provision of a strip spraying apparatus including a pair of endless conveyor belts having contiguously opposed flights advanceable in the same direction between and with which the strip is advanced, together with means upon the belt flights for compressing alternate sections of the strip and means for spraying the intervening non-compressed sections.

These and other desirable objects will become more readily apparent from a reading of the description when examined in conjunction with the accompanying drawings, wherein:

Fig. 1 is a side elevational view of an apparatus constructed according to this invention and for treating and producing the new fibrous strips.

Fig. 2 is a fragmentary sectional view taken generally on the line 2—2 of Fig. 1.

Fig. 3 is a fragmentary elevational view drawn to larger scale showing issuance of the treated strip from the discharge end of opposed belt flights of the apparatus.

Figure 4:
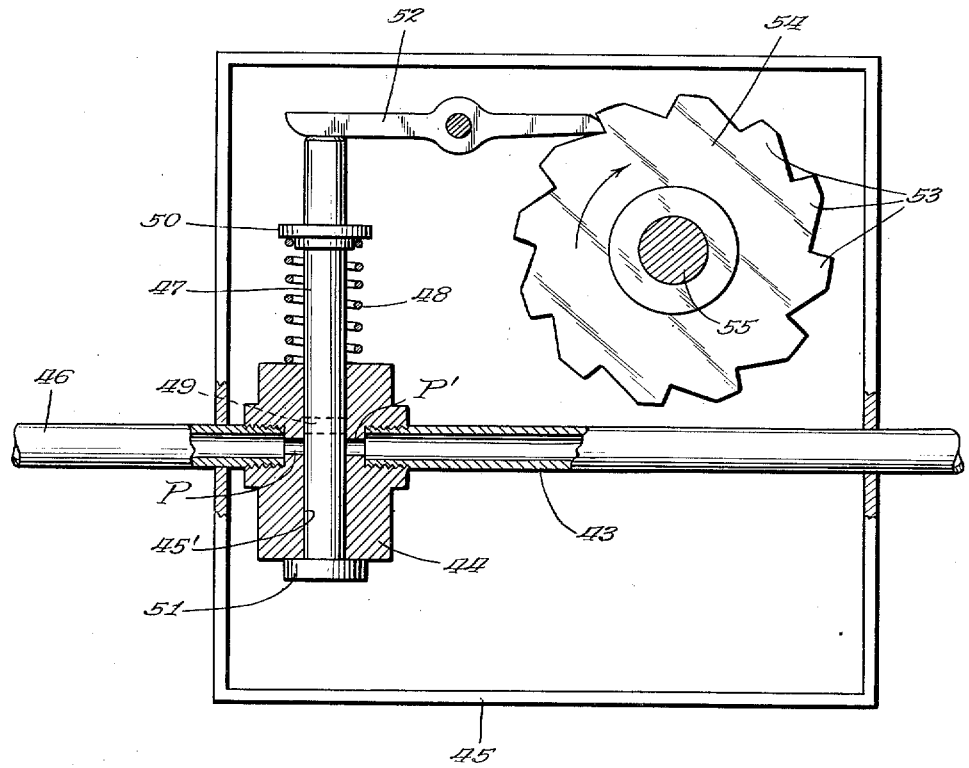
Fig. 4 is a horizontal sectional view taken through a spray control unit of the apparatus at a plane indicated by the line 3—3 of Fig. 1.
Figure 5:
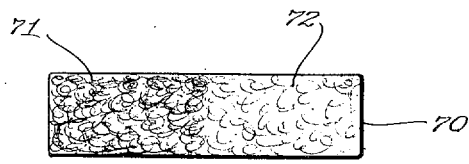
Fig. 5 shows a typical tampon filling unit severed from a fibrous strip treated by the apparatus herein disclosed.

Referring now to Fig. 1, the apparatus there shown for treating and producing the new strips is designated 4. Such apparatus includes an elongated frame having a pair of laterally-spaced uprights 5 at one end and a pair of similar uprights 6 at the opposite end. Each of the uprights 5 and 6 shown conceals the upright pair therewith. The uprights 5 and 6 on each side of the frame are connected by side rails 7 of which the one shown conceals the other. Each side of the frame also has legs 8 and 9 secured to the side rail 7 at the corresponding side of the machine and providing support for a drier unit 10. A side rail 11 is connected between each leg or upright 5 and the drier and a side rail 12 is connected between each leg or upright 6 and the drier.

The apparatus includes upper and lower horizontally extending endless belts respectively designated 14 and 15. Each of these belts, as best shown in Fig. 2, contains sprocket-tooth-receiving recesses 17 within and spaced lengthwise of its inner periphery. The lower flight of the upper belt and the upper flight of the lower belt are in opposed contiguous relation. The upper belt 14 is trained about sprockets 19 and 19' mounted on shafts 20 and 20' which are supported by the frame members 5 and 6. Teeth 21 of these sprockets mesh with the belt sections between the upper belt recesses 17. The lower belt 15 is trained about sprockets 22 and 22' mounted on shafts 23 and 23' supported by the frame members 5 and 6. Teeth 24 of these sprockets project into the recesses 17 of the lower belt 15, or, mesh with the belt sections defined between the longitudinally spaced recesses. Cleats 25 are spaced lengthwise of and mounted on the outer periphery of each belt. These cleats have flat outer faces 26.

Power for driving the belts is obtained from an electric motor 30 which is mounted on a base 31 rigidly associated with the apparatus frame. The motor 30 drives a speed reduction unit 32 which through a sprocket 33 and a chain 34 drives a sprocket 35 with which the shaft 23' is constrained for rotation. The sprocket 24' is constrained for rotation with the shaft 23' and thus drives the belt 15. A gear 36 which is also constrained for rotation with the shaft 23' meshes with and drives an idler gear 37 which in turn drives a gear 39 with which the shaft 20' and the belt-driving sprocket 19' are constrained to rotate. By this driving arrangement the belts are synchronously driven, and when properly phased will cause the cleat faces 26 on each to remain in respective opposed registry with the cleat faces on the other throughout the length of the contiguously disposed belt flights.

A spraying unit 40 is mounted on the machine frame at the receiving end of the apparatus. Such spraying unit includes a pair of spray nozzles 41 respectively mounted on the supporting members 5 at the elevation of the horizontal median plane between the contiguously opposed belt flights; see Fig. 2. The nozzles communicate through branch conduits 42, a main conduit 43 and an intermittently opened control valve 44 (Fig. 4) with a supply conduit 46 to which treating liquid for the fibrous strip is supplied under pressure by any standard equipment of which the details are impertinent to this invention.

The body of valve 44 contains a bore 45' intersected by diametrically opposite ports P and P' which are communicatively isolated excepting when a valve stem 47 is forced downwardly against force of a spring 48 to place a transverse hole 49 of such stem in registry with such ports. A collar 50 and a head 51 on the stem provide limits for its reciprocative movement. The valve stem 47 is movable against the force of spring 51 by a lever 52 pivotal by lobes 53 of a peripherally lobed wheel 54. The wheel 54 is driven synchronously with the belts 14 and 15 by a shaft 55 and companion bevel gears 56 and 57 shown in Fig. 1. The bevel gear 57 is constrained for rotation with the shaft 23 and hence with the belt sprocket 22.

The method and operation

A strip 59 of heterogeneously arranged fibers, such as cotton, etc., is drawn from a container 60, through a guide 61 and inserted between the contiguously opposed horizontal flights of the belts 14 and 15 that are so maintained by vertically spaced guides 61. As previously stated, the cleats 25 are moved in vertically opposed relation by the synchronously driven belts. The strip 59 is moved endwise between the contiguously opposed belt flights and alternate axially adjacent sections 63 are compressed between the surfaces 26 of the cleats, thereby leaving intervening sections 64 of loosely arranged fibers.

The driving arrangement for the cam lobe wheel 54 is so coordinated and timed that while each intervening strip section 64 is passing between the nozzles 41, a lobe on the wheel 53 will be cooperating with the lever 52 to press the stem 47 axially and place its opening 49 in registry with the ports P—P' to cause issuance of the fluid from the nozzles in the form of a spray as illustrated in Fig. 2. The fluid may consist of a solvent carrier for a non-toxic resin which remains as a moisture impervious coating or impregnator of the fibers after volatilization of the carrier component of the fluid. As each intervening section 64 moves on, a space between the wheel cam lobes registers with the lever 52 and allows the spring 48 to close the valve 44 until the succeeding intervening section arrives between the nozzles, whereupon a new valve operating cycle is commenced.

The cleats 25 compress the alternate sections 63 sufficiently tightly that the liquid is confined to the intervening sections 64, and will not spread therefrom to the compressed sections. The strip 59 is advanced at uniform speed and as sections 64 pass through the heater or drier 10 the moisture repellent resin is solidified and the carrier therefor is volatilized. As the strip 59 emerges from the belts 14 and 15 at the right end of the apparatus in Fig. 1 the compressed alternate sections 63 are released. Since the fibers are resilient the strip 59 thereupon reassumes its uniform diameter throughout. In other words the alternate compressed and untreated sections now resume their pre-compressed shape which is of the same diameter or external dimension as the intervening treated sections 64.

The strip 59 may now be cut into individual units 70 assemblable with a porous enclosing jacket to form a tampon having a non-absorbent portion 71 at one end and a fluffy moisture absorbent portion 72 at the opposite end, the tampon being of the same uniform diameter throughout its length.

Having shown and described a single preferred embodiment of the invention with the view of clearly and concisely illustrating the same in accordance with the statutory requirements, I claim:

1. As an article of manufacture; a strip of loose fibers, said strip comprising a concatenation of sections arranged successively lengthwise thereof, the fibers in alternate of the sections being adapted to absorb liquid, and means discreetly associated with a substantial portion of the fibers in the intervening sections to inhibit liquid absorption thereby.

2. As an article of manufacture; a strip of heterogeneously and loosely arranged fibers, said strip including a series of axially adjacent sections of substantially equal transverse sectional area, alternate of said sections being comprised of moisture absorbent fibers and therefore being absorbent of liquid, and the intervening sections being relatively non-absorbent of liquid.

3. As an article of manufacture; a slender strip of soft fibrous material consisting of a mass of heterogeneous loosely-arranged moisture-absorbent fibers, said strip comprising sections arranged in succession lengthwise thereof, and alternate of said sections having a substantial portion of their individual fibers coated with a moisture impervious film.

4. As an article of manufacture; an elongated strip of soft fibrous material consisting of a mass of heterogeneously arranged fibers comprising axially adjacent sections, alternate sections having moisture absorbent fibers, and intervening sections containing individual fibers coated with a moisture impervious film.

5. A method of producing an absorbent article from a strip of heterogeneously loosely arranged fibers comprising the steps of; compressing alternate axially adjacent sections thereby leaving intervening sections of larger transverse dimension, said intervening sections consisting of loosely arranged moisture absorbent fibers, concurrently with the compression, applying a moisture impervious film forming substance to the intervening sections, and releasing the alternate sections from compression.

6. A method of producing an absorbent article from a strip having a mass of heterogeneously loosely arranged fibers, said strip being of substantially uniform external dimension throughout comprising the steps of; compressing alternate axially adjacent sections thereby leaving intervening sections of loosely arranged moisture absorbent fibers, concurrently therewith applying a moisture impervious film forming substance to a substantial portion of the individual fibers of each intervening section, and releasing said compressed alternate sections.

7. An apparatus for making absorbent strips comprising; a pair of endless belts movable contiguously in the same direction; means for feeding a strip of heterogeneously loosely arranged fibers between said belts; means for moving said belts synchronously, each belt including means for advancing and compressing alternate axially spaced sections of said strip thereby leaving intervening sections of loosely arranged absorbent fibers; and means for spraying the fibers of said intervening sections with a liquid for depositing a moisture impervious coating forming substance thereon; the compression of said alternate sections retarding the spreading of liquid outwardly from the intervening sections.

8. An apparatus for making absorbent strips comprising; a pair of endless belts movable contiguously in the same direction; means for feeding a strip of heterogeneously loosely arranged fibers between said belts; means for moving said belts synchronously, each belt including means for advancing and compressing alternate axially spaced sections of said strip thereby leaving intervening sections of loosely arranged absorbent fibers; means for spraying the fibers of said intervening sections with a liquid for depositing a moisture impervious coating forming substance thereon; the compression of said alternate sections retarding the spreading of liquid outwardly from the intervening sections, and drying means for drying said liquid impregnated fibers prior to the release of the alternate sections from compression.

9. An apparatus for making absorbent strips comprising; a pair of endless belts movable contiguously in the same direction; a plurality of cleats connected to each belt; means for feeding a strip of heterogeneously loosely arranged absorbent fibers between said belts; means for moving the belts synchronously whereby the cleats of one belt are in opposed registration with the cleats of the other belt and said strip is advanced endwise therebetween, the cleats tightly compressing alternate axially spaced sections of said strip thereby leaving intervening non-compressed sections of loosely arranged absorbent fibers; means for coating the intervening sections of said strip with a moisture impervious liquid, said means including a spraying element, and means arranged to control the spraying of liquid through said spraying element whereby said spraying element is intermittently operable to spray the intervening moving sections of said strip, the compressed alternate sections being adapted to substantially retard the spreading of the liquid outwardly from the intervening sections.

10. An apparatus for making absorbent strips comprising; a pair of endless belts having outer opposed surfaces movable contiguously in the same direction; a plurality of cleats connected to each belt; means for feeding a strip of heterogeneously loosely arranged absorbent fibers between said belts; means for moving the belts synchronously whereby the cleats of one belt are in opposed registration with the cleats of the other belt and said strip is advanced endwise therebetween, the cleats tightly compressing alternate axially spaced sections of said strip thereby leaving intervening non-compressed sections of loosely arranged absorbent fibers; means for coating the intervening sections of said strip with a moisture impervious coating forming substance, said means including a spraying element; a movable valve means arranged to control the spraying of liquid through said spraying element, and means for operating said valve means in timed relation with said moving belts whereby said spraying element is intermittently operable to spray the intervening moving sections of said strip, the compressed alternate sections being adapted to substantially retard the spreading of the liquid from the intervening sections.

11. An apparatus for making absorbent strips comprising; a pair of endless belts having outer opposed surfaces movable contiguously in the same direction; a plurality of cleats connected to the outer surfaces of each belt in spaced relation; means for feeding a strip of heterogeneously loosely arranged absorbent fibers between said belts; means for moving the belts synchronously whereby the cleats of one belt are in opposed registration with the cleats of the other belt and said strip is advanced endwise therebetween, the opposed spaced cleats thereby tightly compressing alternate axially spaced sections of said strip leaving intervening non-compressed sections of loosely arranged absorbent fibers; means for coating the intervening sections of said strip with a moisture impervious coating forming substance including a carrier liquid, said means including a spraying element, a valve means arranged to control the spraying of liquid through said spraying element, means for operating said valve means in timed relation with said moving belts whereby said spraying element is intermittently operable to spray the intervening moving sections of said strip, the compressed alternate sections being adapted to substantially retain the sprayed liquid within the intervening sections, and heating means positioned between the ends of the opposed surfaces of the belt for drying the liquid in said intervening sections, prior to the release of said compressed alternate sections.

12. An apparatus for making absorbent strips comprising; a pair of endless belts having outer opposed surfaces movable contiguously in the same direction; a plurality of cleats connected to the outer surfaces of each belt in spaced relation, each cleat having a flat outer face; means for feeding a strip of heterogeneously loosely arranged absorbent fibers between said belts; means for moving the belts synchronously whereby the outer faces of the cleats of one belt are in opposed registration with the outer faces of the cleats of the other belt and said strip is advanced endwise therebetween, the opposed faces of said spaced cleats tightly compressing alternate axially spaced sections of said strip thereby leaving intervening non-compressed sections of loosely arranged absorbent fibers; means for coating the intervening sections of said strip with a moisture impervious liquid coating forming substance including a carrier, said means including a spraying element positioned to spray liquid between the opposed moving surfaces of said belt; a movable valve means arranged to control the spraying of liquid through said spraying element, means for operating said valve means in timed relation with said moving belts in timed relation whereby said spraying element is intermittently operable to spray the intervening moving sections of said strip, the compressed alternate sections being adapted to substantially retard the spreading of the liquid outwardly from the intervening sections, and heating means positioned between the ends of the opposed surfaces of the belt for drying the liquid in said intervening sections, prior to the release of said compressed alternate sections.

13. An apparatus for treating absorbent fibrous strips comprising; a pair of endless belts having outer opposed longitudinally extending surfaces movable contiguously in the same direction; a plurality of cleats connected to the outer surfaces of each belt in horizontally spaced relation, each cleat having a flat outer face extending transversely with respect to each belt; means for feeding a strip of heterogeneously loosely arranged absorbent fibers between said belts; means for moving the belts synchronously whereby the outer faces of the cleats of one belt are in opposed registration with the outer faces of the cleats of the other belt and said strip is advanced endwise therebetween, the opposed faces of said spaced cleats tightly compressing alternate axially spaced sections of said strip thereby leaving intervening non-compressed sections of loosely arranged absorbent fibers; means for coating the intervening sections of said strip with a moisture impervious liquid coating forming substance including a carrier, said means including a spraying element positioned adjacent to and between the opposed moving surfaces of said belt; a movable valve means arranged to control the spraying of liquid through said spraying element, means for operating said valve means in timed relation with said moving belts whereby said spraying element is intermittently operable to spray the intervening moving sections of said strip, the compressed alternate sections being adapted to substantially retard the spreading of the liquid from the intervening sections, and heating means positioned between the ends of the opposed surfaces of the belt for drying the liquid in said intervening sections prior to the release of said compressed alternate sections.

14. An apparatus for making absorbent strips comprising; a pair of endless belts having outer opposed longitudinally extending surfaces movable contiguously in the same direction; a plurality of cleats connected to the outer surfaces of each belt in horizontally spaced relation, each cleat having a flat outer face; means for feeding a strip of heterogeneously loosely arranged absorbent fibers between said belts; means for moving the belts synchronously whereby the outer faces of the cleats of one belt are in opposed registration with the outer faces of the cleats of the other belt and said strip is advanced endwise therebetween, the opposed faces of said spaced cleats tightly compressing alternate axially spaced sections of said strip thereby leaving intervening non-compressed sections of loosely arranged absorbent fibers; means for coating the intervening sections of said strip with a moisture impervious liquid coating forming substance including a carrier, said means including a spraying element positioned adjacent to the opposed moving surfaces of said belt; a valve means arranged to control the spraying of liquid through said spraying element, means for operating said valve means in timed relation with said moving belts in timed relation whereby said spraying element is intermittently operable to spray the intervening moving sections of said strip, the compressed alternate sections being adapted to substantially retard the spreading of the liquid from the intervening sections, and heating means positioned between the ends of the opposed surfaces of the belt for drying the liquid in said intervening sections, prior to the release of said compressed alternate sections.

HOWARD C. RIORDAN.

REFERENCES CITED

The following references are of record in the file of this patent:

UNITED STATES PATENTS

| Number | Name | Date |
|---|---|---|
| 2,150,030 | Haberstump | Mar. 7, 1939 |
| 2,236,968 | Cunnington | Apr. 1, 1941 |
| 2,288,072 | Collins | June 30, 1942 |
| 2,336,744 | Manning | Dec. 14, 1943 |
| 2,340,311 | Donovan | Feb. 1, 1944 |
| 2,376,813 | Robins et al. | May 22, 1945 |